Sept. 8, 1931.  G. GODDU  1,821,965
FASTENING INSERTING APPARATUS
Filed Dec. 23, 1926  9 Sheets-Sheet 4

INVENTOR
George Goddu
By his Attorney
Nelson W. Howard

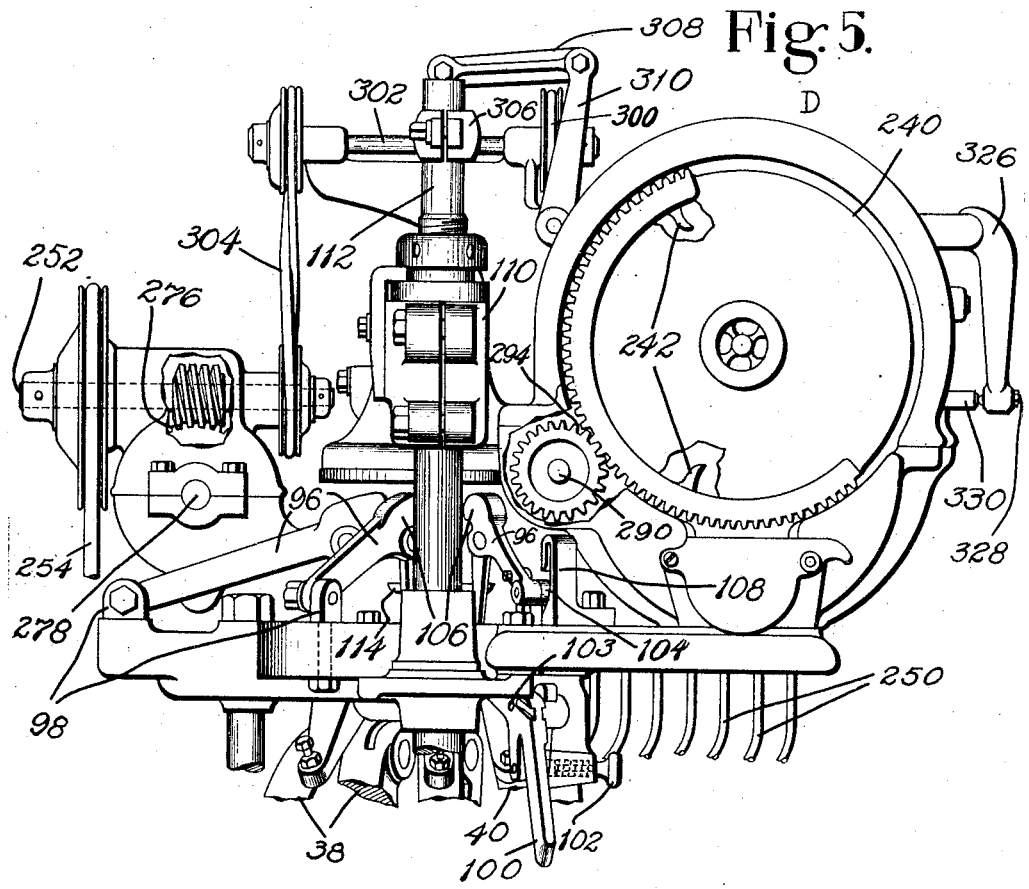

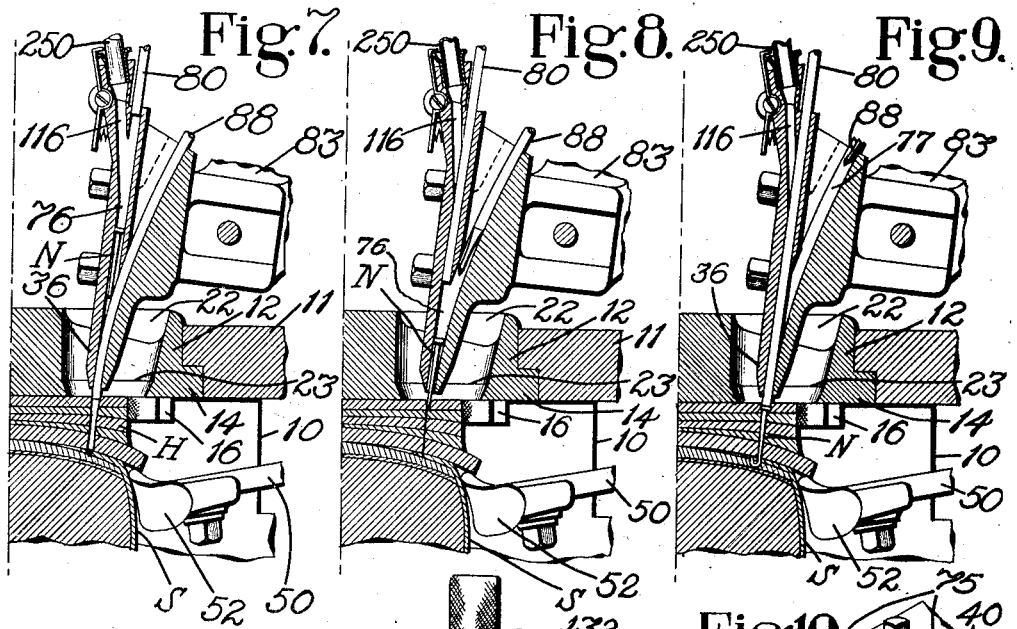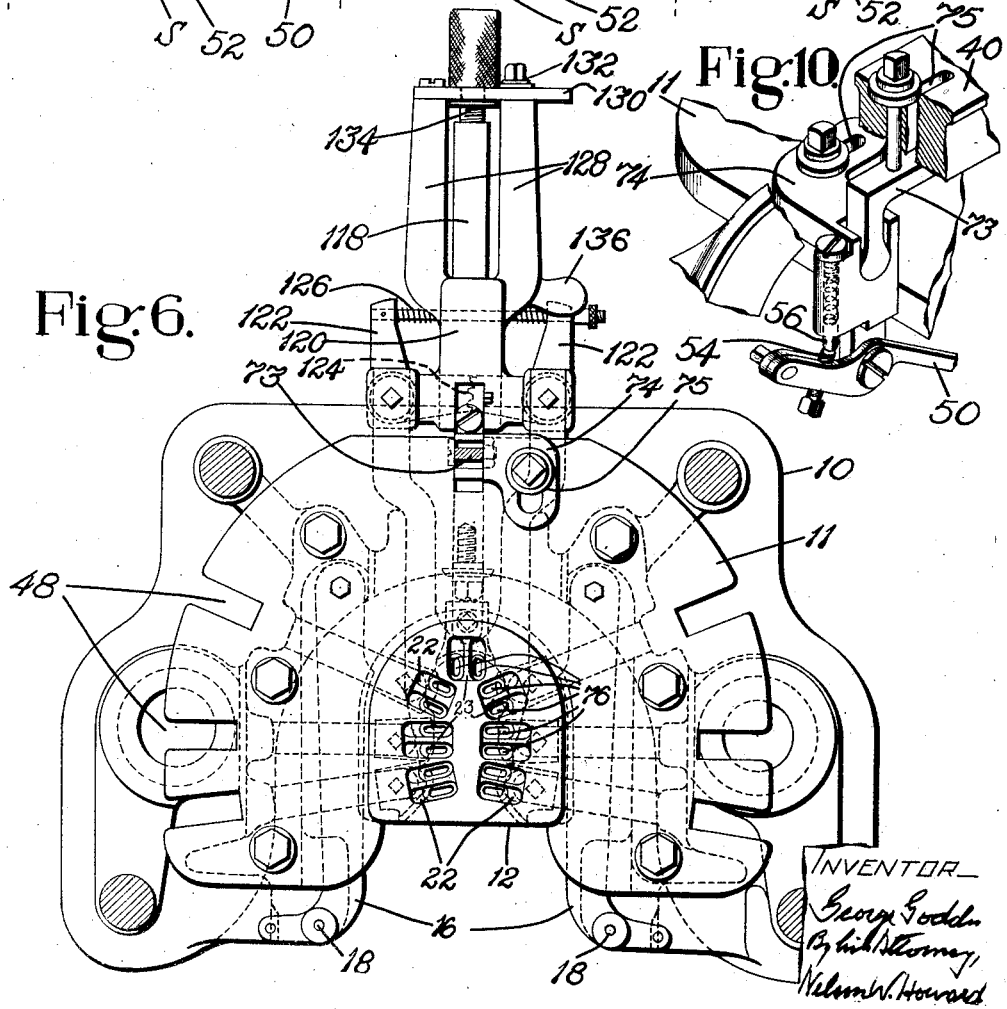

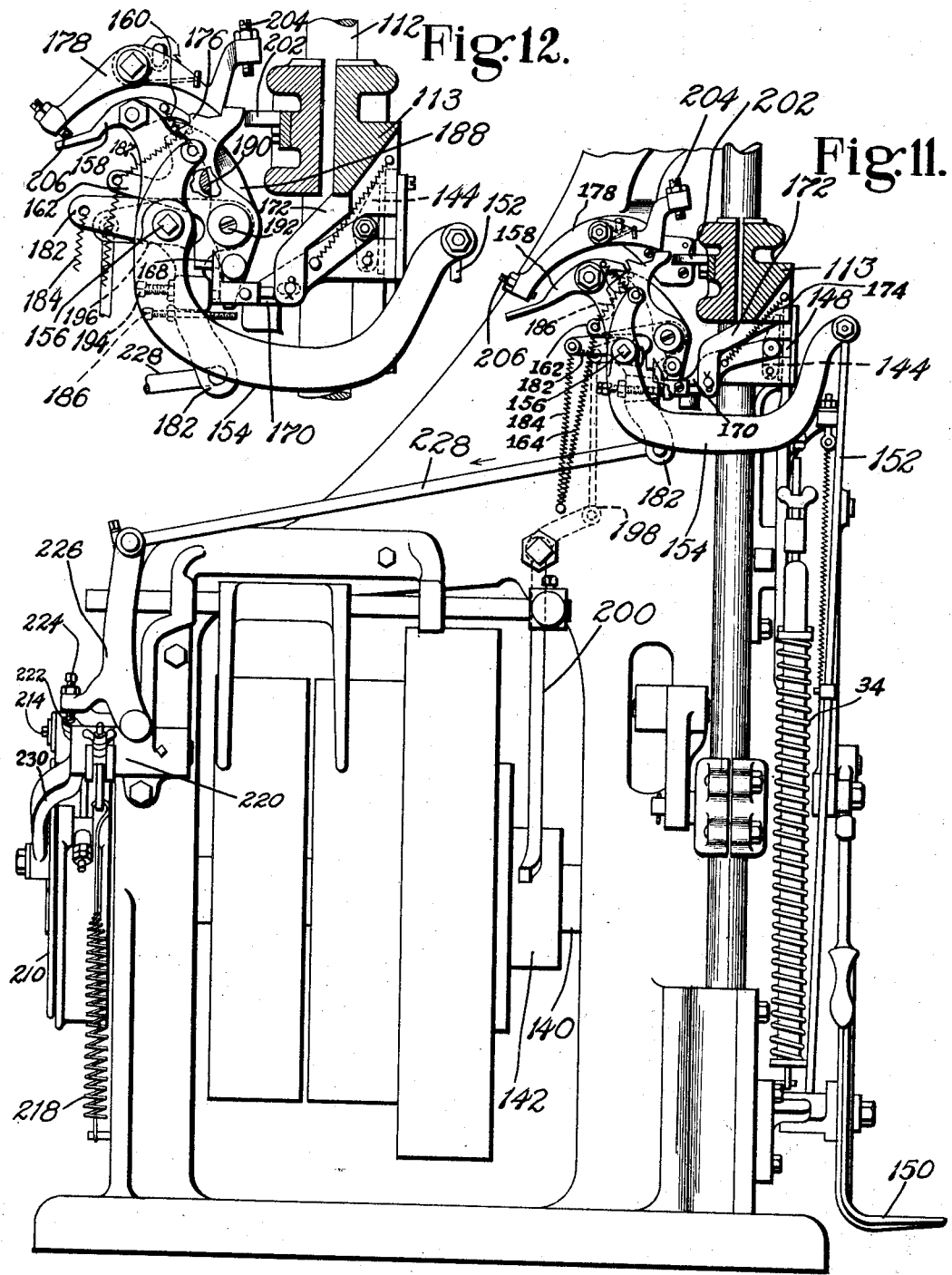

Sept. 8, 1931.   G. GODDU   1,821,965
FASTENING INSERTING APPARATUS
Filed Dec. 23, 1926    9 Sheets-Sheet 8
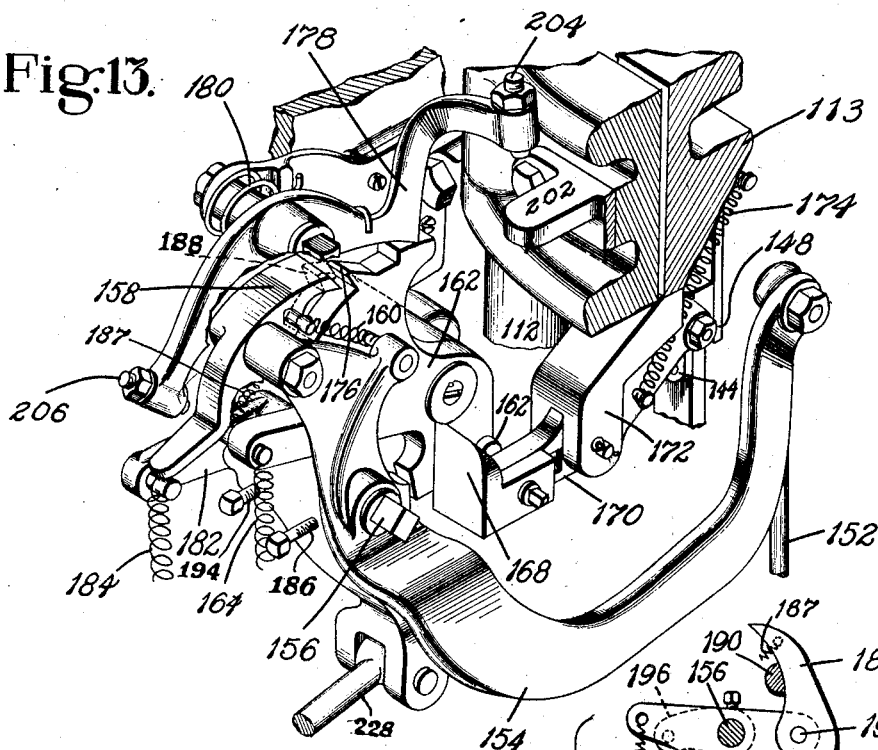
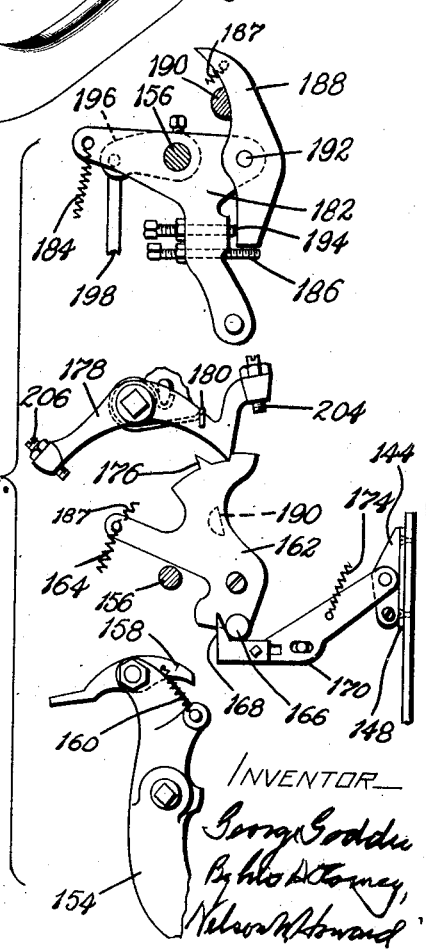

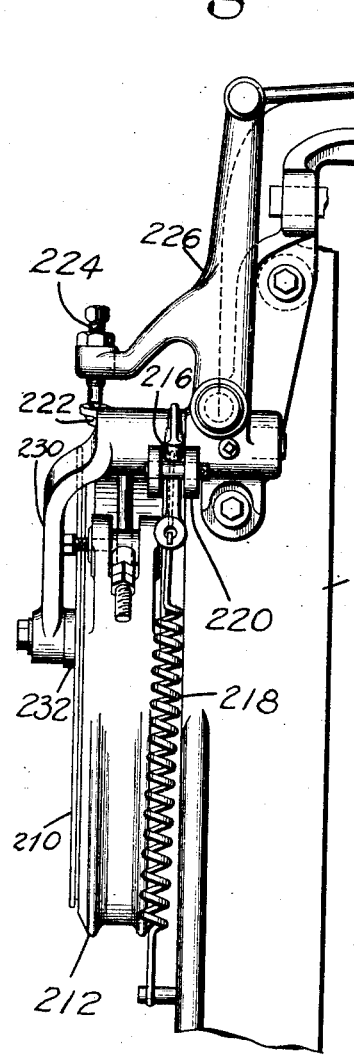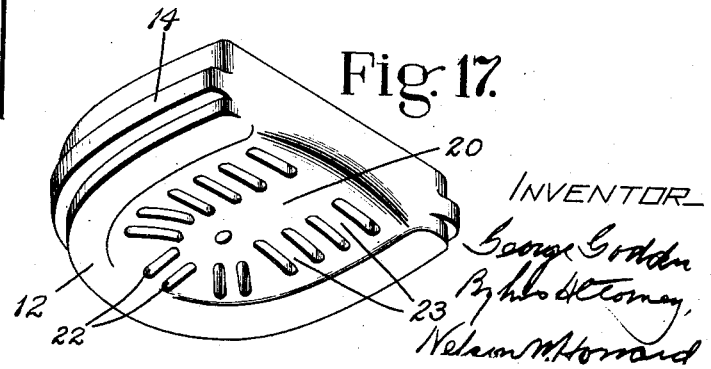

UNITED STATES PATENT OFFICE

GEORGE GODDU, OF WINCHESTER, MASSACHUSETTS, ASSIGNOR TO UNITED SHOE MACHINERY CORPORATION, OF PATERSON, NEW JERSEY, A CORPORATION OF NEW JERSEY

FASTENING-INSERTING APPARATUS

Application filed December 23, 1926. Serial No. 156,580.

My invention relates to apparatus for inserting nails or similar fastenings, being directed particularly to machines for thus operating upon the heel-portions of the soles of shoes. An application for a related apparatus was filed in the United States Patent Office in my name on January 24, 1927, having the Serial No. 163,080 and being entitled "Fastening-inserting machine."

The accurate driving of nails into the rear portions of shoe-bottoms is especially difficult, because of the number of successive groups of fastenings which are there inserted. If the heel-seat is to be nailed, the lasting tacks are already present in the same general area, and when the heel is attached, both the lasting tacks and the heel-seat-nails are likely to be encountered. In either case, the fastenings being driven may be deflected from the correct paths, failing to clinch properly and otherwise producing defects in the shoe. Pricking the work in advance of the insertion of the nails will prevent this, but, as ordinarily practised, considerably increases the expense, and is uncertain, in that the pricking and inserting points may not agree because of the performance of the operations by distinct machines or mechanisms. An object of this invention is to insure the proper driving of the nails and at points so close to the periphery of the counter-portion of the shoe as to give a tight rand-crease.

For the attainment of this end, a feature of the invention consists of a movable support, together with means for moving it upon a frame, in which support are movable a plurality of tools, as an awl and a driver or fastening-inserting member, operating upon the same point in the work, and means for successively moving the tools into operating position. The support, in its movement, as by the contact of a gage member with the work, may be caused to fix the action of the tools at locations determined by the form of the particular shoe being nailed, and the operation of the plural tools in the same support produces perfect agreement in the points at which they operate. Capacity for movement of the gage member upon the support will provide for the necessary change of position of the work in preparation for the inserting operation, as during the application of pressure after the location of the support has been determined. Preferably, the movement of the pricking and driving devices or other tools carried by a particular support is produced by connections to one of these, there being connections between the devices, as by gearing, which cause the movement of the companion device. I have shown the supporting member as having converging passages to receive the tools, one being straight and containing a driver, and another curved and in which operates an awl. There may be a common portion of the passages into which both tools pass, this terminating in a nozzle co-operating with the work. The fastenings to be inserted may be delivered to one of the passages, this, as shown, being that containing the driver. Usually, a plurality of supports or inserting sections would be utilized, and for these an actuating member common to all is desirable. In the illustrated embodiment of the invention, the actuating connections for the tools of a section include a lever fulcrumed upon the machine-frame, and these levers of plural sections may be so arranged that they are all under the influence of the actuating member.

As the size of the work decreases, such an apparatus as the present will be called upon to operate over a less area, as to insert fewer fastenings. Another feature of the invention involves the prevention of movement by the common actuating member of the tool or tools of a chosen section or sections, while the effect of said member upon other tools continues. For example, the inserting sections at the breast-corners of the heel-seat may be thrown out of action. Preferably, to accomplish this, the connections of the tools acted upon by the actuating member to produce their movement are removed from its influence. In the disclosed embodiment of the invention, there is associated with a chosen lever or levers through which the tools are actuated, means for changing the position of their fulcra. This may be caused to carry the levers outside the field of the actuating member, and thus stop the tool in its operation.

The alteration in the actuating lever may conveniently be produced by fulcruming it upon another lever, the oscillation of which will shift the actuating lever bodily toward and from the actuating member.

Change in the size of the work also renders desirable a variation in the normal position of the sections, since, if these were always set for the smallest shoe, some, as those nearest the breast-corners of the heel-seat, would be required to yield to an undue extent under the influence of the work during its advance upon the supporting jack into contact with the sections. I therefore include in the apparatus, as a feature of the invention, means to produce such a normal variation, this preferably affecting simultaneously sections at opposite sides of the jack. More specifically, the alteration in the relation of the sections may be obtained by a cam or cams controlled by the operator. The adjustment of a section by such a device may be extended to the adjacent section, there being shown connections between them which cause the one directly moved to, in turn, move its companion.

A further feature of the invention concerns the arrangement of the inserting sections, one, preferably at the rear, being normally fixed, and others, as those at opposite sides of the work-support or jack, being yieldable, or otherwise movable toward and from said work-support. The fixed section may serve as a back-stop governing the distance through which the work is moved into the machine and giving a constant point of insertion of the fastening or fastenings, while the associated fastenings are changed in position in accordance with the size of the shoe. This normally constant position may, however, be varied, if necessary, by means for fixing this section in different positions. The gage member of this normally fixed section is preferably adjustable independently of the section-adjustment, so the location of the entire nailing design with reference to the shoe, and of the rear nail with respect to the periphery of the counter, may be determined separately.

As still another feature, the operator is given an interval between the application of pressure to the work, which prepares it for the operation upon it, and the starting of said operation, during which interval any defects in the location of the work may be corrected. There is included in the apparatus the usual treadle or other operator-controlled member, movable from an inactive to an active position, and combined with this are connections acting upon the initial movement thereof to start the pressure-applying mechanism, and also connections to the member for starting the operating mechanism, as for pricking and nailing, the last-mentioned connections being effective only upon the second movement of the member after return to its inactive position. Between the treadle-depressions, the necessary work-adjustments may be made. In the illustrated machine, there are treadle-connections for releasing a tensioned spring by which pressure is applied to the work, and other connections for starting in operation the pricking and nailing mechanisms. In one of these, as that first affected, a member is included, with which is associated means for retaining it in the position to which it is moved to govern the associated mechanism. These connections are thus rendered independent of the treadle-operation, and may be released for the succeeding operation in the action of the mechanism last governed. More particularly, a lever may be moved by the treadle to release the spring or other pressure mechanism, and latched, and another lever moved by a second treadle-depression to start the pricking and nailing mechanism, which, in its operation, trips the latch so the starting system is restored to normal.

Because one of the reciprocatory tools of this machine, as the awl, is advanced by connections to the associated tool or nail-inserting member, as the latter retreats from the work under the influence of a direct connection to the driving or power mechanism, as a further feature of the invention, this last-mentioned tool is stopped at the termination of an operating cycle between the extremes of its travel, in the present instance in its outward movement. This result I obtain by brake mechanism associated with the driving clutch, which, upon the release of the clutch, is applied to stop the inserting member at a predetermined point.

Other features of the invention will appear upon consideration of the detailed description and claims, among these being connections to the energizing or actuating mechanism belonging to the nailing mechanism, by which connections there may be thrown into and out of operation the distributing mechanism, or portions thereof, by which nails are supplied for insertion.

While the various features of this invention have been described as particularly applicable to a fastening-inserting mechanism, it is to be understood that they are not necessarily so limited. They may, for example, be utilized in a pricking machine, in which no nails are driven.

In the accompanying drawings furnishing an illustration of a particular embodiment of my invention, Fig. 1 is a front elevation of that portion of the machine including and above the jack-post, parts being broken away;

Fig. 5 shows, in elevation, the opposite side of the distributing mechanism from Fig. 4;

Fig. 6 is a horizontal section taken just above the die-block;

Figs. 7, 8 and 9 are vertical sectional details through one of the inserting sections, the awls and drivers occupying successive positions in the operating cycle;

Fig. 10 is a detail in perspective of the adjustment for the rear section and its rand-crease-gage;

Fig. 11 is a broken side elevation, looking from the left in Fig. 2, particularly illustrating the spring-releasing and clutch-tripping mechanism;

Fig. 12 is a similar view, enlarged, of the principal spring and clutch-controlling elements, showing them in another position than that illustrated in Fig. 11;

Fig. 13 shows the same parts in perspective;

Fig. 14 is a separated view of these elements;

Fig. 15 is a front elevation of the controlling members directly associated with the brake;

Fig. 16 is a side elevation of these elements; and

Fig. 17 illustrates in perspective the die-block used for heel-seat-nailing and molding.

Figure 1:
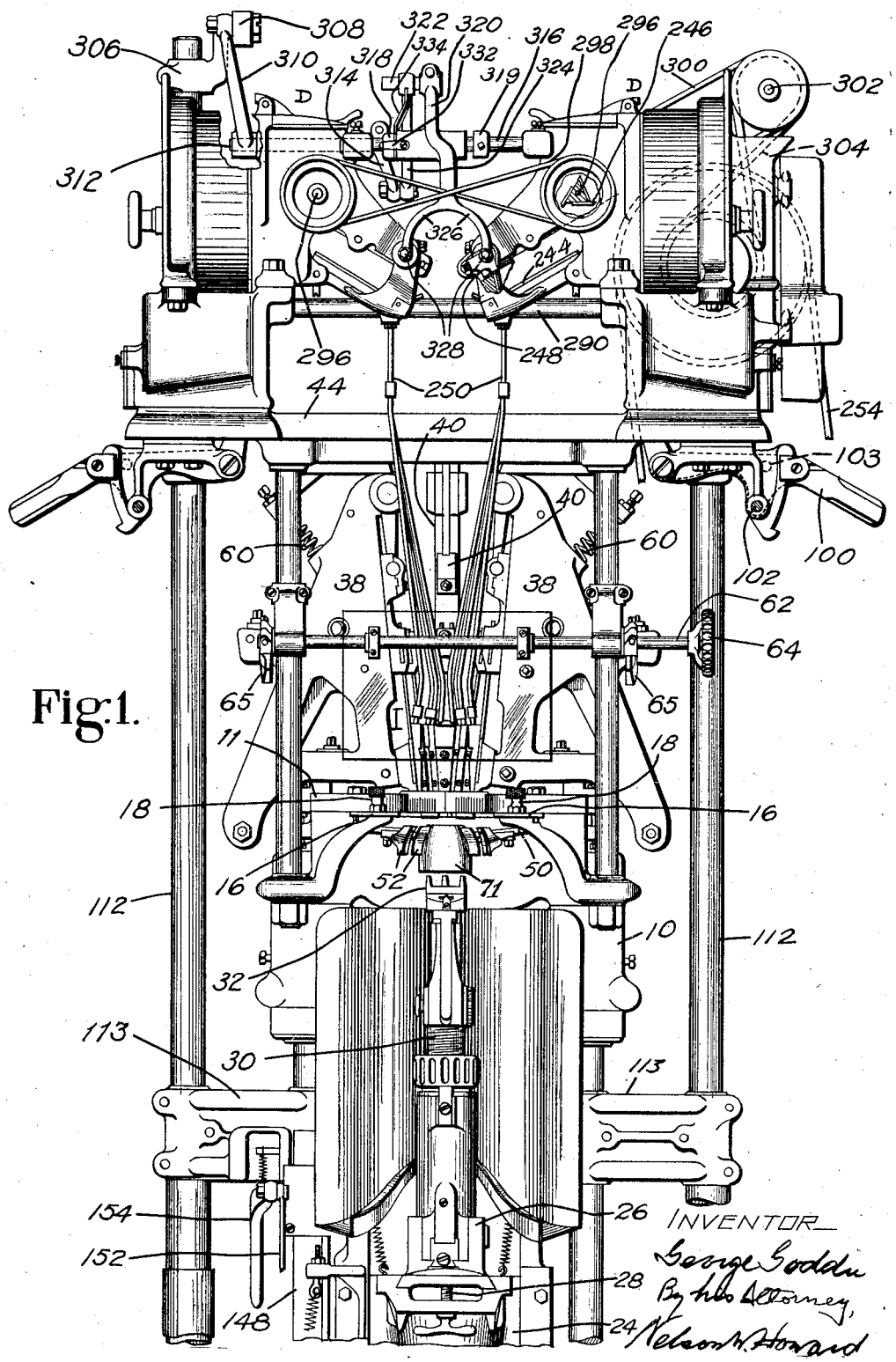

In a frame 10 is carried, upon a table 11, a horizontal abutment or die-block 12, against the under side of which the work is forced during the driving of the nails. A flange 14 (Fig. 3) formed upon the die-block bears against an overhanging portion of the table to resist the upward thrust of the work. The block is shown as supported upon retaining members 16, 16 (Figs. 4 and 6), pivoted near the rear of the table and latched in place by spring-pins 18. For nailing heels, the form of die-block shown in Figs. 7, 8 and 9 may be employed, this having a plane lower surface, which which contacts the tread-portion of the heel to be attached. When heel-seats are to be nailed, I prefer to form, in the under side of the block, a recess 20, as shown in Fig. 17. This has substantially the contour of the cooperating end of the heel which is to be secured against it to the shoe, so that, during the nailing operation, the pressure applied will cause the heel-seat to be molded to such a form as to aid in obtaining a tight rand-crease when the heel is in place. In the die-block, this being true of both of the previously mentioned forms, is a series of vertical openings 22, generally arranged in accordance with the points of insertion of the nails in heels or heel-seats, and being of sufficient size, by virtue of their elongation toward the periphery of the block, to include within them all the nailing designs which the machine is to produce. Each opening 22 is double, being divided at its lower portion by a wall 23, this increasing the surface at the under face of the die-block, against which the work is pressed.

Below the die-block, in vertical ways in the frame, slides a cross-head 24 (Figs. 1 and 2), and horizontally upon this is movable a jack-base 26, which may be secured in place to determine its vertical alinement with the die-block by means of a screw 28 threaded into the base and passing through a horizontal slot in the cross-head. A jack-post 30 is pivoted upon the base, and when swung to a vertical position presents the work carried upon its top 32 to the under side of the die-block. When the post is forwardly inclined, the work may conveniently be jacked or removed. The adjustment fixed by the screw 28 insures the post remaining in position during the application of pressure, without being turned out about its pivot under the influence of a horizontal component of such pressure. The mechanism for moving the cross-head, and therefore the jack, may be as in Letters Patent of the United States No. 446,885, Pope, February 24, 1891, though the application of preliminary or measuring pressure may be effected by a spring 34, such as is disclosed in Patent No. 1,207,-563, Kenway, December 5, 1916, except for the novel means for initiating the operation of said spring, which will be described later.

Figure 3:
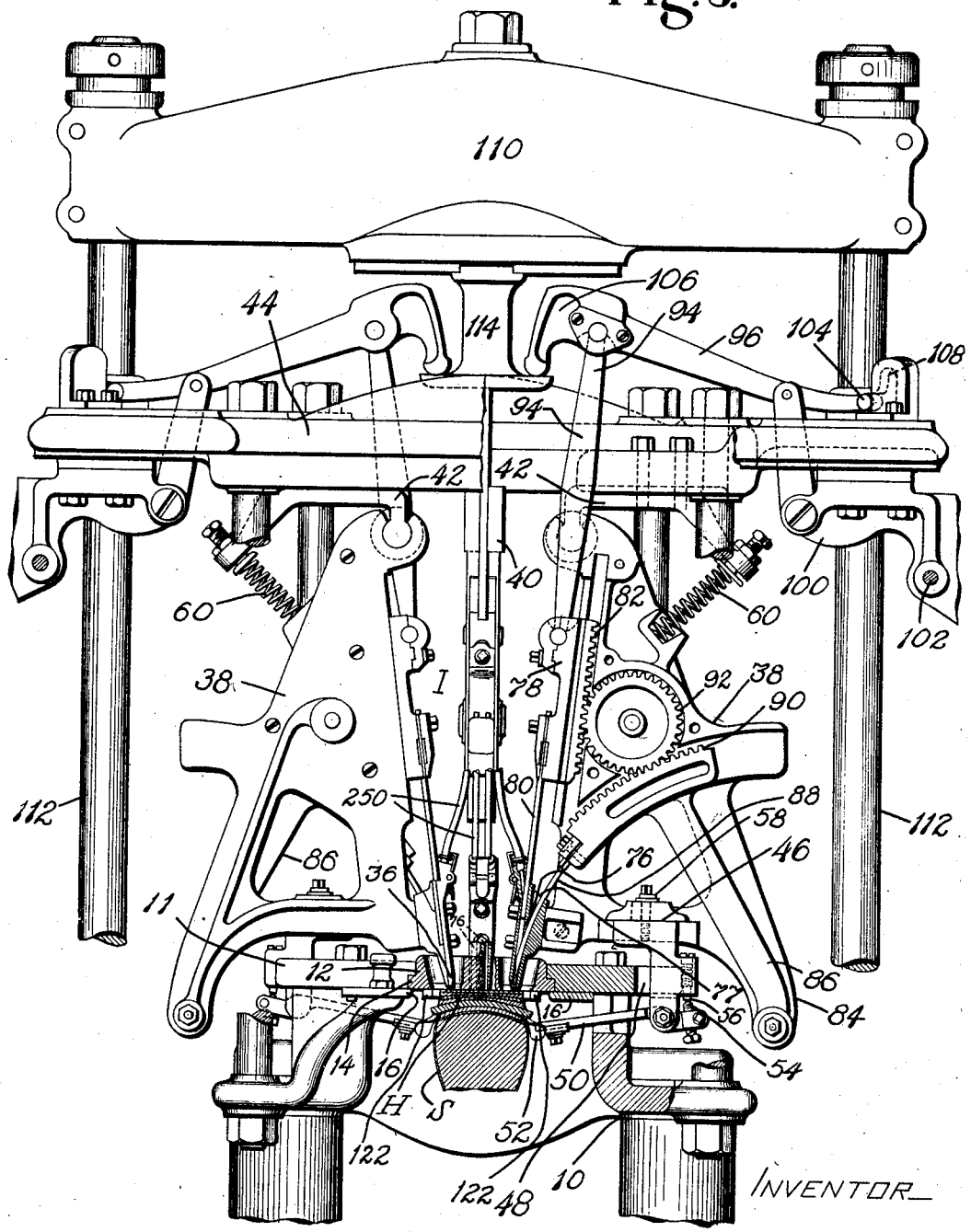
Fig. 3 is an enlarged front elevation of the pricking and nailing sections, together with the more closely associated parts.

Into each of the openings 22 in the die-block extends the delivery-portion or nozzle 36 of one of a series I of nail-inserting mechanisms, seven of these mechanisms being shown. Each inserting mechanism has a body-section, the six side sections 38 being yieldably mounted, while the rear section 40 (Fig. 4) is normally fixed in position, though it may be adjusted. Each section 38 depends from a pivot member 42 (Fig. 3) secured to the under side of a bridge-piece 44 extending across the frame above the die-block and its table. Adjustably attached to each section 38 near its lower portion is a bracket or carrier member 46 guided in a slot 48 in the table (Figs. 3 and 6). Beneath the table upon each bracket is pivoted a gage-arm 50, at the inner end of which is fixed a contact-head 52 formed with a curved surface arranged to engage the counter-portion of a jacked shoe and an upper edge adapted to enter the rand-crease of said shoe. Outside the pivotal point of each gage-arm a screw 54 is threaded, its upper end engaging a spring-pressed plunger 56 movable in the bracket. The screws 54 will be so adjusted that, when the jack is turned up upon its pivot, the rand-crease of the shoe which it carries will be engaged by the heads 52, these, as a result of this contact, forcing out the inserting sections, so that the nozzles of all are in close proximity to the periphery of the heel to be attached or the edge of the sole to be nailed, thus tending to produce a tight crease. The gage-arms may rise with the jack against gravity, and may also be moved down to some extent from their normal positions by virtue of the yield of the plungers 56. The gage members will therefore move transversely with respect to the oscillation of the sections, following the work vertically toward and from the die-block in the operation of the machine without danger of breakage.

The relation between the head of the gage and the nozzle, and therefore the distance of the points of insertion of the nails from the outside of the heel or from the rand-crease, may be varied by adjusting the members 46 upon the sections 38 by slot-and-screw connections 58, by which said members are secured. A spring 60, interposed between each section and a depending portion of the pivot member 42, normally holds the section at its inmost position, ready to be forced out by the contact of the work with the gage member. For certain of the sections, as the two at each side nearest the breast-corners, there might be offered undue resistance to the introduction of a jacked shoe, if it were necessary, for a large size, to force aside the gages when located for engagement by a shoe of a small size. I therefore provide an adjustment for the normal position of these sections. As illustrated, this adjusting device consists of a horizontal spindle 62 (Fig. 1) journaled across the front of the frame, and carrying at one end a hand-wheel 64, by which it may be rotated. Near opposite extremities of the spindle are secured cams 65, the inclined surfaces of which contact with projections 66 (Fig. 4) from the forward faces of the two outer sections 38. By rotating the spindle, the cams may be caused to swing the nozzles of these sections away from the center of the die-block through the openings 22 to the desired extent. To move the second section at each side, each cam-actuated section may have a bracket 68 secured to it by a slot-and-screw connection 70, a depending portion engaging a projection 72 from the adjacent section. This causes the second section to move outwardly with the first at each side when the hand-wheel 64 is turned. The relative movement of the sections may be altered by a change in the position of the brackets 68 to introduce more or less lost motion before contact is made with the projections 72. Since the rear heel-attaching or seat-securing nail or nails are customarily inserted at the same point for all sizes, the rear section is not permitted to yield upon the swinging in of the jacked shoe, but is held against turning upon the bridge-piece by a connection 73 to a bracket 74 attached to the table at the rear of the die-block (Figs. 6 and 10). This bracket may carry the rear gage-bar 50. The securing means both of the section to the bracket and said bracket to the table may be of the screw-and-slot type, as indicated at 75, so an initial adjustment of the rear-nail position may be made and the relation of the gage-arm may be independently varied. The work-contacting surface 71 of this rear arm may be more extended vertically than the heads 52, it serving as a back-stop which will determine the inward movement of the jack, the counterportion of the shoe traveling over this surface when pressure is applied by the machine.

In the inner side of each inserting section are two parallel passages 76, somewhat downwardly and inwardly inclined with respect to the vertical (Figs. 3 and 7 to 9), and entering each of these passages at its outer side and near its lower extremity is a curved passage 77. These pairs of parallel passages 76 are adapted for the insertion of two nails side by side through a single section. The number, however, may be greater or less. In the present instance, the nozzles are divided or forked so the passages of each pair terminate at opposite sides of the walls 23. Movable in ways in each section is a carrier-slide 78, to which is fixed a pair of drivers 80 extending into the passages 76. At the outer side of this slide is a rack 82. Upon a depending portion 84 of each section is pivoted an arm 86 having, at the inner extremity of its upper segmental portion, a pair of awls 88, which operate in the curved passages 77. The awl-carrying portion of each arm 86 has formed upon it a rack-segment 90, and rotatable upon the section and meshing with the racks 82 and 90 is a pinion 92 communicating the travel of one of the connected members to the other. Articulated to each driver-slide is a link 94 joined to a lever 96. All the levers but those belonging to the two forward sections are fulcrumed upon lugs or brackets 98 upon the upper side of the bridge-piece 44. Each of the forward levers is fulcrumed upon a bell-crank lever 100, which is, in turn, fulcrumed beneath the bridge-piece. A spring-pin 102, movable horizontally through the bracket upon which each lever 100 is mounted, may engage either of two openings 103 (Fig. 1) formed in an expanded portion of the lever. When the pin is in the lower opening of the lever 100, the lever 96 which it supports is held in, with a head 106 carried upon its inner extremity in proximity to the vertical axis of the apparatus. With the pin in the other opening of the lever 100, the supported lever is drawn out, it being retained toward the end of its travel by the engagement of a roll 104, which it carries upon its outer extremity, with a cam-slot in a member 108 fixed to the outer end of the bridge-piece. In this way, the forward nail-inserting sections may be withdrawn from actuation by the mechanism described below, when the size of the work does not call for so long a series of fastenings.

To operate the drivers and awls, the upper sides of the heads 106 of all the levers 96, when the forward pair are in their active positions, are engaged by a contact member furnished by a top girt 110 connected to vertical side rods 112, 112 reciprocated as in the Pope and Kenway patents previously referred to. The upper portion of each side rod is shown offset at 113 to give space for the inserting sections 38. The engagement of the top girt lowers the levers 96 to cause the descent of the drivers 80 in their passages and, through the gearing 82, 90 and 92, the simultaneous elevation of the awls 88. The levers 96 are raised by engagement with the under sides of their heads 106 of a flanged member 114 depending from the top girt. This produces a reverse movement of the drivers and awls, the former rising while the latter are being lowered by the gearing. In this last movement, the awls are projected through the nozzles 36 to prick the work, while in the first instance the drivers act upon nails supplied to the passages to insert them; see Fig. 9 of the drawings. These nails or other fastenings are delivered from distributing mechanism, to be later described, through lateral passages 116 into the driver-passages 74 against the sides of the lowered awls. This is as appears in Fig. 7.

When heels are to be nailed, they should be clamped in position beneath the die-block 12 to receive the pressure of the heel-seat of the jacked shoe. For this purpose, a guide-bar 118 (Figs. 4 and 6) projects from the rear of the frame, and has arranged to slide on it a support 120. Pivoted upon this support, and projecting at opposite sides of the die-block, are levers 122, 122, at the forward ends of which are jaws curved to adapt them to engage and retain a heel inserted between them. The levers are shown as geared together at 124, and the jaws are urged yieldably toward each other by a spring device 126 associated with the outer ends of the levers. The support 120 has rearward extensions 128, 128 lying at opposite sides of the bar 118. Upon the end of one of these extensions is pivoted a yoke member 130, which hooks over a stud 132 projecting from the other extension. The yoke member, in its lowered relation, enters a peripheral groove in the head of a screw 134 threaded into the extremity of the guide-bar. When the apparatus is to be utilized for the attachment of heels, the clamp just described occupies the position illustrated in Fig. 6, it being latched in position by the member 130. Here, its relation to the die-block openings may be altered by turning the screw 134, its engagement by the member 130 sliding the jaw-support along the guide-bar. If, on the other hand, heel-seats are to be nailed, the yoke member 130 is raised, and the support 120 slid back to the outer end of the bar 118, thus removing the clamping jaws from their engaging position beneath the die-block. A handle 136 is shown as projecting from one of the support-extensions to facilitate this movement of the heel-clamp.

The side rods 112, operating the pricking and driving mechanisms, may be reciprocated from a power-shaft 140 under the control of a single-rotation clutch mechanism, indicated at 142 in Fig. 11, precisely as in the Pope patent previously mentioned. The spring 34 for applying the measuring pressure to the work may be tensioned, as in the Kenway patent, through engagement of a pawl 144 pivoted upon one of the offset members 113 with a projection from a slide 148, movable vertically upon the frame and to which the upper end of the spring is connected. In the Kenway organization, the pawl is withdrawn from the slide to release the spring and the clutch tripped to start the power-operation of the machine as a result of successive effects exerted during a single depression of the treadle. I find it desirable to give the operator an opportunity to adjust the shoe after the pressure has been applied by the spring and before final pressure and the pricking and driving operations. I provide for this by producing the two effects of applying pressure and pricking and driving through two separate treadle-depressions. The operator has, therefore, such time as he desires for the adjustment of the work. A treadle 150 is pivoted, as usual, across the front of the lower portion of the frame (Figs. 2 and 11), and is joined by a link 152 to a bell-crank lever 154 arranged to turn about a spindle 156 rotatable in the frame at the rear of the point at which the offset 113 comes to rest when the machine stops. Referring now particularly to Figs. 11 to 14, pivoted upon the upper end of the lever 154 is a pawl 158, provided with a wide engaging end and drawn by a spring 160 against the arcuate top of a release-lever 162 fulcrumed upon the frame at one side of the lever 154. This lever 162 is normally held back by a spring 164, so that a projection 166 from one side of a portion depending below the fulcrum lies just in front of an upward projection 168 on a horizontally movable slide 170. This slide is guided upon a bracket 172 projecting from the under side of the member 113, and is joined at its forward extremity to the pawl 144. A spring 174 draws forward the slide and pawl to hold the latter normally in position to engage the slide 148 for the purpose of maintaining the spring 34 tensioned. Upon depression of the treadle and the consequent turning of the lever 154 in a clockwise direction from the position illustrated in Figs. 11 and 13, the pawl 158 is carried against a tooth 176 rising from the upper curved edge of the lever 162. This, in turn, force the projection 166 of the lever 162 against the projection 168 of the slide 170, withdrawing the pawl 144 from beneath the slide 148, and thus releasing the spring 34. The expansion of this spring through the connections described in the Kenway patent raises the jack to force the heel-seat of the shoe which it carries against the heel clamped by the levers 122 beneath the die-block. In this pressure-spring-releasing position, the lever 162 is temporarily retained by a detent 178 pivoted upon the frame and held by a spring 180 in engagement with the curved edge of the lever 162. The elements are now as they appear in Fig. 12. After the operator has made any necessary changes in the position of the work, he depresses the treadle a second time. Fixed to the spindle 156 is a clutch-controlling lever 182. In the normal relation of the elements, a spring 184 urges a stop-screw 186, threaded horizontally through a depending arm of this lever, against a portion of the frame. A spring 187, connected at one end to a detent-portion 188 of the lever 182, draws this detent into yieldable engagement with a projection 190 from the side of the lever 162, to which lever the other end of the spring is joined. When the movement of the lever 162 was initiated, the upper point of the detent-portion 188 was somewhat to the rear of the engaging point of the pawl 158, being in the same vertical plane as that side of said point to the left of the lever 162 (Fig. 13). As the lever 162 is swung forward to trip the pressure-spring, its projection 190, bearing against the detent-portion, carries the lever 182 with it, and when the detent 178 latches the lever 162, the lever 182 is correspondingly held in an advanced position, and though its travel is not sufficient to at this time affect the mechanism it controls, the detent-portion 188 is now in front of the retracted pawl 158. To insure the proper relation to the pawl, the portion 188 may be adjusted on its pivotal mounting at 192 upon the lever 182, by a screw 194 turning in the lower portion of said lever adjacent to the screw 186 and bearing against a depending portion of the detent. Secured to the spindle 156 with the lever 182 is an arm 196 united through connections 198 to an arm 200, by which the clutch 142 is governed. The second depression of the treadle causes the pawl 158, by its engagement with the detent-portion 188, to turn the lever 182 in a clockwise direction. During this movement, the spring 187 elongates, so the lever 162 is unaffected. The consequent lifting of the arm 196 acts through the connections 198 to permit the engagement of the clutch for starting a cycle of operations. As the side rods rise in their initial movement, a projection 202 from the member 113 strikes a contact-screw 204 threaded vertically through the inner end of the detent 178. This withdraws the detent from its engagement with the lever 162, so that it may be returned by its spring to normal. At the same time, a screw 206, carried by the opposite end of the detent, comes in contact with the tail of the pawl 158, freeing the detent-portion of the lever 182 and also allowing this to be brought by the spring 187 to its original position. All the parts are now ready for the initiation of another operating cycle.

Since to leave the drivers and awls in the correct relation for beginning another pricking and nailing operation, the side rods and top-girt must stop before reaching the upper extreme of their travel, braking mechanism is associated with the power-shaft 140 to insure this. As best shown in Figs. 15 and 16, there is fast upon the shaft a drum 210 about which is a brake-band 212, one end of this band being attached to the frame at 214 and the other to a multiple-armed lever 216 fulcrumed upon said frame. A spring 218, acting upon an arm 220 of the lever, exerts its force to draw the band into engagement with the drum. With an arm 222 of the lever contacts a screw 224 threaded vertically through a horizontal arm of a bell-crank lever 226 fulcrumed upon the frame. To a second arm of the lever 226 is joined a link 228 leading to the lower end of the clutch-controlling lever 182. The relation of the elements is such that, just before the second treadle-depression causes the lever 182 to produce engagement of the clutch through the connections 198, the link 228 turns the lever 226 in an anti-clockwise direction (Fig. 16), similarly rotating the lever 216 (Fig. 15). This releases the brake-band from the drum against the tension of the spring 218. Immediately before the shaft 140 starts in rotation, an arm 230 of the lever 216 withdraws a roll 232 from an arcuate depression 234 in the side of a hub 236 upon the outer face of the drum. As the shaft rotates, the periphery of the hub comes beneath the roll and locks the lever 216 in its brake-releasing position. This continues until the opposite side of the depression 234 reaches the roll, when, near the termination of one rotation of the shaft 140 and a complete operation of the inserting mechanisms, the entrance of the roll into the depression occurs as the clutch is automatically disengaged. This releases the spring 218, tightening the brake-band about the drum, and stopping the apparatus at the desired point.

Figure 4:
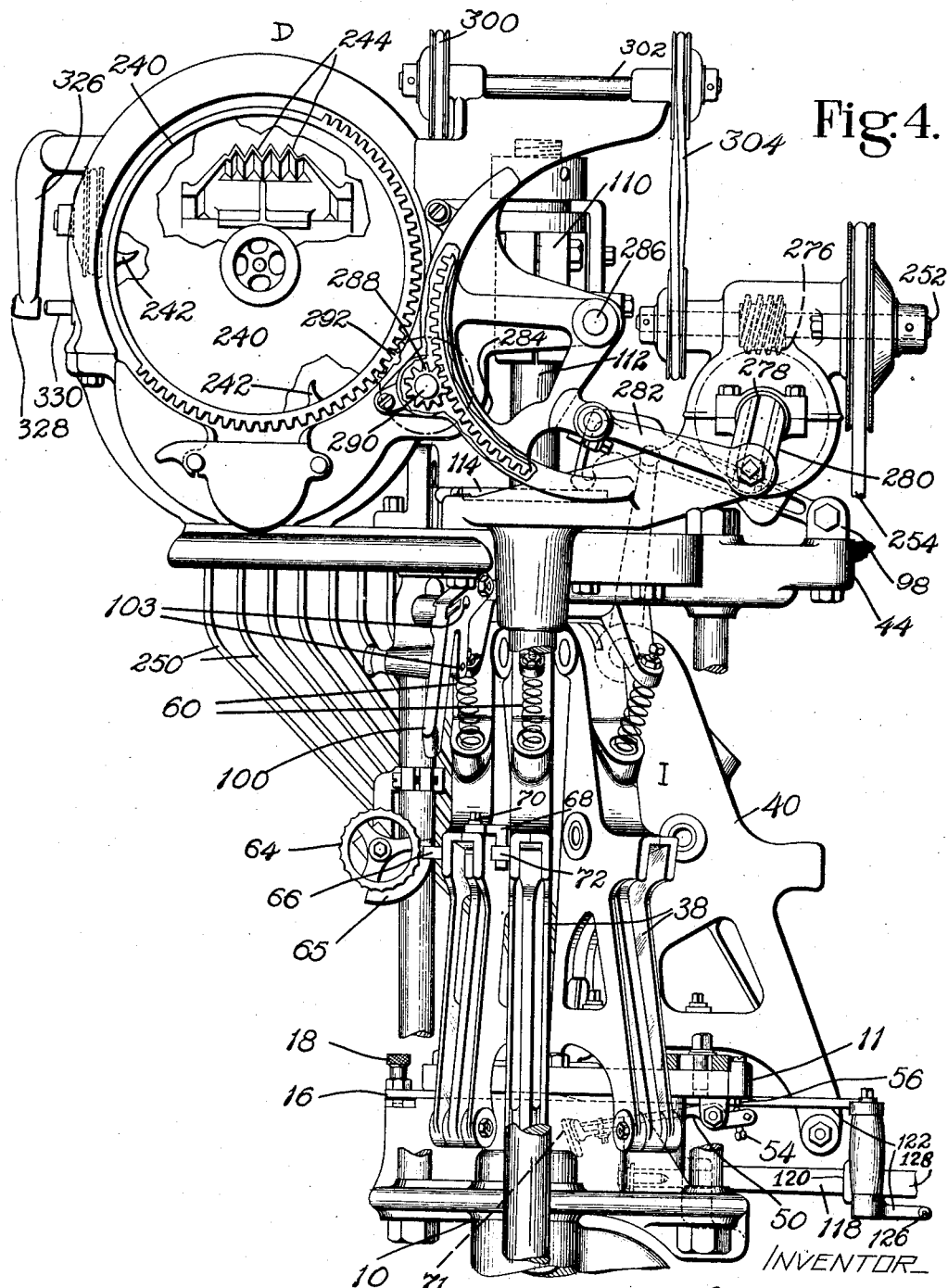
Fig. 4 is a side elevation of the same part of the apparatus as appears in Fig. 3, but including a distributing mechanism.

To supply the fastenings to the passages 116 in the pricking and nailing sections in correctly timed relation with the movement of the awls and drivers, I may employ such distributing mechanisms as are particularly illustrated in Figs. 1, 4 and 5 of the drawings.

Figure 2:
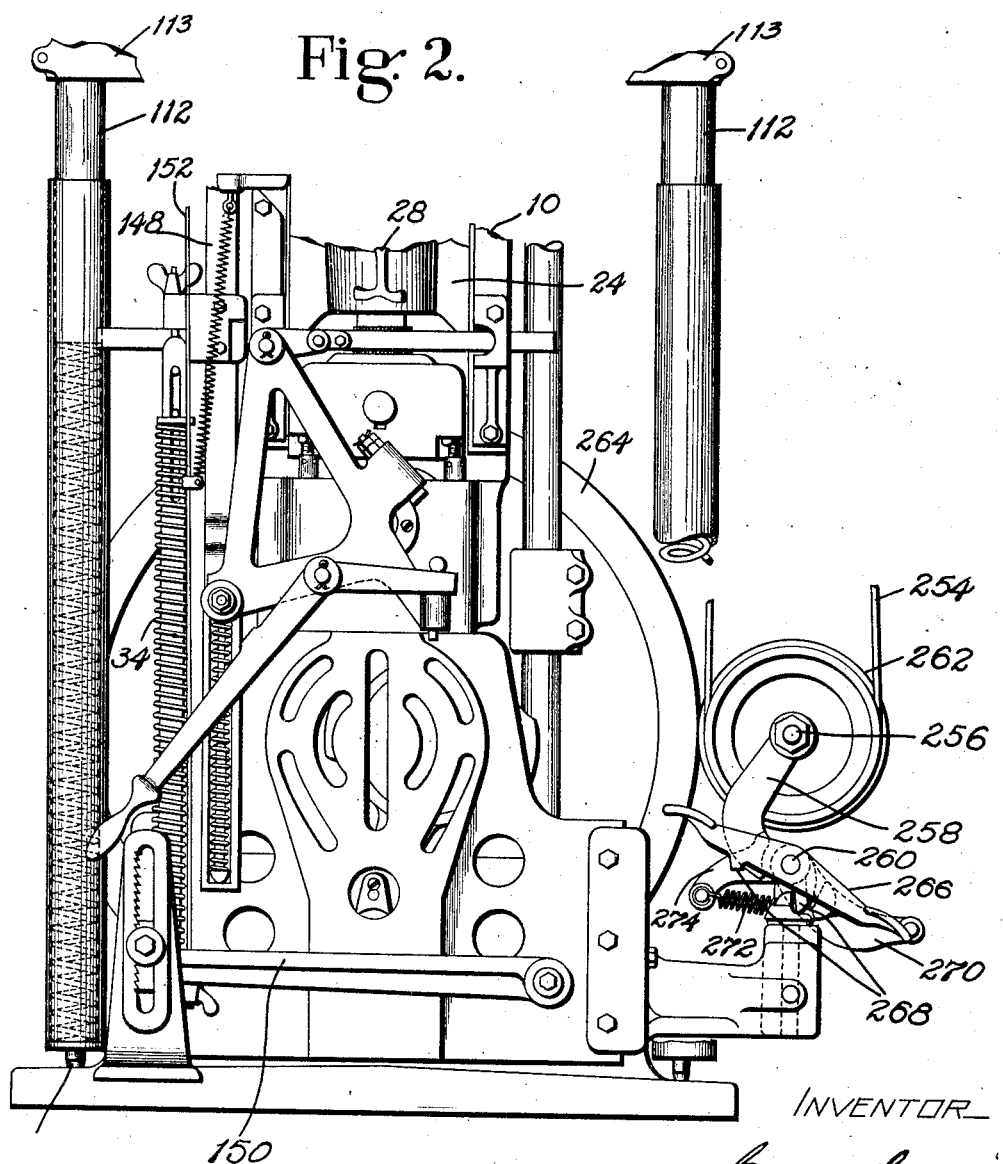
Fig. 2 is a similar view of the lower portion of the machine.

Two of these mechanisms D, D are used in the present instance, giving a convenient arrangement for the delivery of a large number of nails, and also allowing two lengths of these nails to be delivered simultaneously. The distributing mechanisms may be mounted at opposite extremities of the bridge-piece 44, and each may have generally the structure disclosed in United States Patents No. 1,002,422, McFeely, September 5, 1911, and No. 1,107,337, McFeely, August 18, 1914. Each of these mechanisms D includes an oscillatory drum 240 movable about a horizontal axis and delivering alternately by opposite buckets 242, 242 to a series of parallel raceways 244, down which the nails slide suspended by their heads. Rotatable clearing wheels 246, journaled above the raceways, act to prevent clogging. A separating plate 248 is arranged to reciprocate transversely across the ends of each set of raceways to pick off groups or loads of nails, these dropping into tubes 250 leading to the respective passages 116 of the sections 38 and 40 and being sufficiently flexible to allow the swinging of the sections. For the operation of these elements, I have provided the following improved means:

Rotatable in a bearing upon the bridge-piece is a shaft 252 (Fig. 4) belted at 254 to a shaft 256 rotatable on a bracket 258 turning about a spindle 260 journaled at one side of the lower portion of the frame (Fig. 2). Fast upon the shaft 256 is a friction-roll 262, which may bear against the periphery of a fly-wheel 264 on the shaft 140. Secured to the spindle 260 is a double treadle 266, limited in its movement by opposite stop-projections 268, 268, which may contact with an upstanding portion of the treadle-mounting. There is also fast on the spindle an arm 270, the end of which is joined by a tension-spring 272 to an arm 274 depending from the bracket 258. When pressure is applied to the right-hand pad of the treadle 266 to bring it to the position illustrated in Fig. 2, the arm 270 is carried down below the spindle 260, so that the tension of the spring is exerted upon the arm 274 to draw the roll 262 against the fly-wheel, thus rotating the shaft 252 through the belting 254. Pressure upon the opposite or inner treadle-pad raises the arm 270 above the spindle 260, exerting an opposite effect upon the arm 274, the roll at this time being drawn away from the fly-wheel. By this arrangement, the portions of the distributor actuated from the shaft 252 may be driven or allowed to remain at rest.

The rotation of the shaft 252 is transmitted through worm-gearing 276 to a short shaft 278 journaled just above the bridge-piece. Projecting from one end of this shaft 278 is a crank 280, to which is adjustably connected a link 282 pivoted at its opposite extremity to a gear-segment 284 fixed to a shaft 286 rotatable upon the distributor-frames. The segment meshes with a pinion 288 on a shaft 290 extending transversely of the apparatus. At 292, this shaft is geared to one of the nail-drums 240, and at its opposite end, at 294, to the companion drum. The arc through which the drums turn is such that the buckets 242 alternately lift the nails from the mass in the lower portion of the drums and throw them across the raceways toward the opposite sides, effectively covering the entire width, so that all receive a constant and approximately uniform supply.

The clearing wheels are fixed to shafts 296 journaled just above the raceways, and belted together at 298. One of the shafts 296 is joined by a belt 300 to a shaft 302 journaled at the top of the frame, and belted at 304 to the shaft 252. Consequently, whenever the drums are in oscillation, as a result of the depression of the treadle 266 to the position shown in Fig. 2, the clearing wheels are in continuous rotation.

I prefer to reciprocate the separators 248 from one of the side rods 112. For this purpose, said rod has attached near its upper extremity a collar 306, from which a lug is united by a link 308 to an arm 310 fixed to a spindle 312 (Fig. 1) turning upon the frame of one of the distributors. The spindle has fastened upon it another arm 314. Secured at its opposite ends in the two distributor-frames is a rod 316, and movable upon this, between stop-collars 318 and 319, is a rocking lever 320. The upper extremity of the lever carries an elongated horizontal pin 322, which is connected by a link 324 to the arm 314. The lower end of the lever 320 is forked at 326, and carries contact-screws 328, 328 cooperating with extensions 330 from the separators 248 of the two distributors. The separators are held at one extremity of their travel by springs (not shown) to close the raceways, and are moved into their delivering positions by the lever in its oscillation as the side rod rises. Since it may be convenient to operate the machine, as for testing or adjustment, when the feed of nails would be undesirable, the delivering action of the separators may be discontinued. To this end, the lever 320 is releasably latched to the collar 318 by a spring member 332. In this latched relation, the screws 328 and separator-extensions 330 are alined, and the oscillation of the lever causes the reciprocation of the separators. If the latch is released and the lever moved into engagement with the collar 319, the oscillation has no effect upon the separators, since the screws play at one side of the extensions 330. The distributors therefore deliver no nails to the sections. In both adjustments of the lever 320, the pin 322 and link 324 remain in engagement, said link being held against lateral displacement by a bar 334 secured to the collar 318 and extending into a slot in the upper end of the link.

Assuming that the apparatus is to be employed for the attachment of heels to shoes, the die-block 12 is mounted upon the table, and the forward sections 38 adjusted, if necessary, by means of the hand-wheel 64 to correctly position them for the width of work to be operated upon. If the heel to be nailed is small, the two front sections may be completely withdrawn from action by means of the levers 100. A heel H being inserted between the jaws of the levers 122, which are at this time latched forward upon their guide-bar beneath the die-block, a lasted shoe S is placed upon the jack 30 while this is forwardly inclined, and is then swung up against the gage-surface 71 with the heel-seat beneath the clamped heel. In attaining this position, the sections 38 are forced aside as the rand-crease of the shoe engages their heads 52, and the nozzles 36 are all located at predetermined distances from the periphery of the counter-portion. Initially, the drivers 80 are raised to points shown in Fig. 3, these being less than their full elevation, the ends of the awls 88 being in proximity to the openings in the nozzles. When the apparatus is started by depressing the treadle 150, the withdrawal of the pawl 144 releases the spring 34. This causes the elevation of the jack to apply the measuring pressure to the work. The work thus under pressure having been located to the satisfaction of the operator, a second depression of the treadle releases the brake-band 212 by movement of the link 228 and trips the clutch 142 through the connections 198. As the machine starts in operation, it applies final or clamping pressure to the work, the drivers rise, and, through the intermediate gearing, lower the awls, which enter the heel to prick it to receive the securing nails (Fig. 7). Thereupon the drivers descend, causing the withdrawal of the awls (Fig. 8). Before said awls have passed the passages 116 to which are joined the distributor-tubes 250, the distributors D have acted to deliver a load of nails N, which will lie in the passages with their points resting against the awls. When the awls free the ends of these passages and just before the drivers reach them, the nails fall through the passages 76 into the pricked openings, and the continued depression of the drivers inserts them through these openings into the heel-seat of the shoe, where they are clinched (Fig. 9). Since there is no change in the position of the work between the pricking and driving operations, the nails unfailingly enter the pricked openings, and the waste of time by an intermediate handling is avoided. The cycle terminates with the drivers partly elevated, and the awls lowered to the openings of the nozzles, ready for the next operation. If the operator wishes to run the machine without the delivery of nails to the sections, he slides over the lever 320, so that its contact-screws are out of alinement with the extensions 330 of the separator-plates, thus stopping the picking-off of nails from the raceways, and may also discontinue the oscillation of the drums 240 and the rotation of the clearing wheels 246 by depression of the inner end of the treadle 266. For nailing heel-seats, the action may be exactly the same, except that a die-block containing the molding recess 20 is substituted for the plane-faced block, the heel-clamping device is slid back to its inactive position, and nails suitable for seat-nailing are placed in the drums of the distributors D.

Having described my invention, what I claim as new and desire to secure by Letters Patent of the United States is:

1. In a fastening-inserting apparatus, a frame, a support movable thereon, means for moving the support upon the frame, a plurality of tools movable on the support to operate upon the same point in the work while said support is maintained against movement, and means for successively moving the tools into operating position.

2. In a fastening-inserting apparatus, a movable support, a plurality of tools movable on the support to operate upon the same point in the work, means for successively moving the tools into operating position, and a gage member carried by the support for contact with the work.

3. In a fastening-inserting apparatus, a movable support, an awl and a fastening-driver operating upon the support, and connections controlled by the driver in its movement and arranged to reciprocate the awl oppositely to said driver.

4. In a fastening-inserting apparatus, a support, a pricking device movable upon the support, a driving device movable upon the support, connections to one of the devices for moving it, and connections from the device thus moved to the associated device for moving the latter and being independent of the connections first mentioned.

5. In a fastening-inserting apparatus, a support, an awl movable thereon, a driver movable upon the support, actuating connections for the driver, and connections between the driver and awl arranged to actuate said awl and being independent of the connections first mentioned.

6. In a fastening-inserting apparatus, a support, an awl movable thereon, a driver movable upon the support, gearing connecting the awl and driver, and a member connected to one of said elements and through which power is applied for operating both.

7. In a fastening-inserting apparatus, a frame, a member movable upon the frame and provided with passages converging to a common passage, and a plurality of tools operating in respective passages and movable into the common portion of the passage.

8. In a fastening-inserting apparatus, a frame, a member pivoted upon the frame and provided with passages converging to a common portion terminating in a nozzle co-operating with the work, and a plurality of tools operating in respective passages and movable into the common portion.

9. In a fastening-inserting apparatus, a frame, a member movable upon the frame and provided with passages converging to a common portion, a plurality of tools operating in respective passages and movable into the common portion, and means mounted upon the frame independently of the member and arranged to deliver fastenings to one of the passages while the tool belonging to the converging passage is in the common portion of said passages.

10. In a fastening-inserting apparatus, a jack, a member mounted to move toward and from the jack and having converging passages, an awl movable in one passage, and a driver movable in another passage.

11. In a fastening-inserting apparatus, a frame, a member movable upon the frame and having converging passages, an awl movable in one passage, a driver movable in another passage, and means mounted upon the frame and having connections for delivering fastenings to one of the passages.

12. In a fastening-inserting apparatus, a member having a straight passage and a curved passage communicating with the straight passage, a driver movable in the straight passage, and an awl operating in the curved passage.

13. In a fastening-inserting apparatus, a member having a straight passage and a curved passage communicating with the straight passage, a driver movable in the straight passage, an awl operating in the curved passage, and a fastening-supplying tube opening into the straight passage.

14. In a fastening-inserting machine, a frame, a support movable thereon, a tool movable in the support and under the influence of said support in the movement of the latter, a lever fulcrumed upon the frame, connections between the lever and tool, and a reciprocatory actuating member for the lever.

15. In a fastening-inserting machine, a frame, a support movable thereon, a tool movable in the support and under the influence of said support in the movement of the latter, a lever fulcrumed upon the frame, connections between the lever and tool, and a reciprocatory member arranged to move the lever in opposite directions.

16. In a fastening-inserting machine, a frame, a support movable thereon, a tool movable in the support, a lever fulcrumed upon the frame, a link connecting the tool and lever, and a reciprocatory member arranged to contact with opposite sides of the lever.

17. In a fastening-inserting machine, a support, a slide movable thereon, a driver carried by the slide, an arm pivoted upon the support, an awl carried by the arm, gearing connecting the slide and arm, and means for reciprocating the slide.

18. In a fastening-inserting machine, a frame, a support pivoted upon the frame, a slide movable upon the support, a driver carried by the slide, an arm pivoted upon the support, an awl carried by the arm, gearing connecting the slide and arm, a lever fulcrumed upon the frame, a link joining the lever and slide, and a reciprocatory member contacting with the lever.

19. In a fastening-inserting apparatus, a plurality of inserting sections mounted for independent movement as determined by the work, and a work-pricking and a fastening-inserting device movable upon each section.

20. In a fastening-inserting apparatus a plurality of inserting sections mounted for independent movement as determined by the work, a work-pricking and a fastening-inserting device movable upon each section, and means for moving the devices in each section simultaneously.

21. In a fastening-inserting apparatus, a plurality of inserting sections mounted for independent movement, a work-pricking and a fastening-inserting device movable upon each section, an actuating member, and connections under the influence of the actuating member and arranged to move the devices of each section simultaneously in opposite directions.

22. In a fastening-inserting apparatus, a plurality of inserting sections mounted for independent movement, a work-pricking and a fastening-inserting device movable upon each section, an actuating member common to all the sections, and connections to a device of each section under the influence of the actuating member.

23. In a fastening-inserting apparatus, a plurality of inserting sections mounted for independent movement, a work-pricking and a fastening-inserting device movable upon each section, an actuating member common to all the sections, connections to an inserting device of each section under the influence of the actuating member, and connections from the inserting device to the pricking device arranged to actuate the latter.

24. In a fastening-inserting apparatus, a movable support, a plurality of tools movably mounted on the support to operate upon the same point in the work, means for successively moving the tools into operating position, and a gage member movable upon the support and arranged by contact with the work to determine the point of operation of the tools.

25. In a fastening-inserting apparatus, a movable support, an awl and a fastening-driver carried by the support, means for reciprocating said awl and driver, and a gage member movable upon the support and arranged to determine the point of operation of the awl and driver.

26. In a fastening-inserting machine, the combination with an abutment, of a work-support movable toward and from the abutment, fastening-inserting sections movable in cooperation with the abutment, and a gage member movable upon each section under the influence of the work.

27. In a fastening-inserting machine, the combination with an abutment, of a work-support movable toward and from the abutment, fastening-inserting sections movable in cooperation with the abutment, and a gage member movable upon each section under the influence of the work and arranged to move such section by contact with said work.

28. In a fastening-inserting machine, a pivoted inserting section, and a gage member pivoted upon the section for movement in a direction transverse to that of said section.

29. In a fastening-inserting machine, a movable inserting section, a shoe-support, and a gage member movable upon the section and arranged to enter the rand-crease of a supported shoe.

30. In a fastening-inserting machine, the combination with an abutment, of a work-support movable toward and from the abutment, a fastening-inserting section movable upon the side of the abutment opposite the work-support, and a gage member movable upon the section under the influence of the supported work.

31. In a fastening-inserting machine, the combination with an abutment, of a work-support movable toward and from the abutment, a fastening-inserting section movably supported at one side of the abutment, a gage member movable upon the section at the opposite side of the abutment, and means arranged to vary the normal position of the gage member in the direction of movement of the work-support.

32. In a fastening-inserting machine, the combination with an abutment, of a work-support movable toward and from the abutment, a fastening-inserting section movably supported at one side of the abutment, and a gage member yieldably mounted upon the section, the support for the member being at the opposite side of the abutment from that for the section.

33. In a nailing machine, a table provided with openings comprehending a nailing design and slots outside the openings, nailing sections extending into the openings and carrier members passing through the slots, and gage members mounted on the carrier members.

34. In a nailing machine, a table provided with openings comprehending a nailing design, nailing sections having nozzles extending into the openings, and awls and drivers movable through the nozzles of the sections.

35. In a nailing machine, a table provided with openings comprehending a nailing design and slots outside the openings, nailing sections having nozzles extending into the openings and brackets passing through the slots, awls and drivers movable through the nozzles, and gage members carried by the brackets.

36. In a fastening-inserting apparatus, a plurality of sections, a tool movable upon each section, a movable actuating member for the tools, and means arranged to prevent the movement of a tool by the actuating member while its effect upon other tools continues.

37. In a fastening-inserting apparatus, a plurality of sections, a tool movable upon each section, a movable actuating member for the tools, connections to the tools acted upon by the actuating member, and means arranged to remove the connections of a tool from the influence of the actuating member.

38. In a fastening-inserting apparatus, a support, a tool movable thereon, a lever through which the tool is actuated, said lever being movable into and out of operating relation, and means arranged to change the position of the fulcrum of the lever to determine its operative condition.

39. In a fastening-inserting apparatus, a support, a tool movable thereon, a contact member joined to the tool, a reciprocatory actuating member, a member connected to the contact member and arranged to move it into and out of the path of the actuating member, and means arranged to fix the moving member in either of its extreme positions.

40. In a machine for operating upon the heel-portions of shoes, a plurality of sections each having a movable fastening-inserting member, two of these sections being arranged to operate in proximity to the breast-corners of the heel-seat, and means arranged to stop the action of a breast-corner-section while the operation of other sections continues.

41. In a fastening-inserting apparatus, a support, a tool movable thereon, a lever through which the tool is actuated, and a lever upon which the actuating lever is fulcrumed.

42. In a fastening-inserting apparatus, a support, a tool movable thereon, a lever through which the tool is actuated, a lever upon which the actuating lever is fulcrumed, a reciprocatory actuating member, and means for fixing the position of the fulcrum-lever with the actuating lever in and out of the path of the actuating member.

43. In a fastening-inserting apparatus, a support, a tool movable thereon, a lever through which the tool is actuated, a lever upon which the actuating lever is fulcrumed, and a fixed member by which the fulcrum-lever is guided in its movement.

44. In a fastening-inserting apparatus, a support, a tool movable thereon, a lever through which the tool is actuated, a lever upon which the actuating lever is fulcrumed, a reciprocatory actuating member, means for fixing the position of the fulcrum-lever with the actuating lever in and out of the path of the actuating member, and a cam member in engagement with which the fulcrum-lever is moved.

45. In a machine for operating upon the sole-portions of shoes, a work-support, a plurality of operating sections mounted to yield in their normal positions from the support, and means arranged to change the normal position of a section.

46. In a machine for operating upon the sole-portions of shoes, a work-support, a plurality of operating sections mounted to yield from the support, and means arranged to change simultaneously the normal positions of sections at opposite sides of the support.

47. In a machine for operating upon the heel-portions of shoes, a work-support, a plurality of operating sections mounted to yield from the support, means arranged to change the normal position of a section, and connections between said section and another section arranged to position the latter.

48. In a machine for operating upon the heel-portions of shoes, a work-support, a plurality of operating sections mounted to yield from the support, means arranged to change the normal position of a section, connections between said section and another section arranged to position the latter, and means arranged to vary the effect of the connections.

49. In a machine for operating upon the heel-portions of shoes, a jack, a plurality of operating sections movable toward and from the jack, and a cam engaging a section and movable to change its normal position.

50. In a machine for operating upon the heel-portions of shoes, a jack, a plurality of operating sections movable toward and from the jack, a spindle extending in proximity to the sections, and cams fixed to the spindle and engaging opposite sections.

51. In a machine for operating upon the heel-portions of shoes, a jack, a plurality of operating sections movable toward and from the jack, a cam engaging a section and movable to change its normal position, and projections from the thus-positioned section and an adjacent section contacting to position the latter.

52. In a machine for operating upon the heel-portions of shoes, a jack, a plurality of operating sections movable toward and from the jack, a cam engaging a section and movable to change its normal position, projections from the thus-positioned section and an adjacent section contacting to position the latter, and means arranged to adjust one of the projections upon its section.

53. In a fastening-inserting apparatus, a work-support, a plurality of inserting sections movable toward and from the support, and an inserting section movable relatively to the support but normally fixed against movement.

54. In a fastening-inserting apparatus, a work-support, inserting sections mounted to yield from their normal positions at opposite sides of the support, and an inserting section at the rear of the support held against yielding.

55. In a fastening-inserting apparatus, a work-support, inserting sections yieldably mounted at opposite sides of the support, an inserting section at the rear of the support, and means arranged to fix the rear section in different positions.

56. In a fastening-inserting apparatus, a work-support, inserting sections yieldably mounted at opposite sides of the support, an inserting section at the rear of the support, means arranged to vary the normal position of the yieldable sections, and means arranged to fix the rear section in different positions.

57. In a fastening-inserting machine, a frame, a work-support, a fastening-inserting section mounted upon the frame, means arranged to fix the inserting section against movement in different positions toward and from the support, a work-gage associated with the section, and means arranged to differently position the gage independently of the support.

58. In a fastening-inserting machine, a frame, a bracket adjustable upon the frame, a fastening-inserting section pivoted upon the frame and adjustably secured to the bracket, and a work-gage carried by the bracket.

59. In a machine for operating upon the heel-portions of shoes, an abutment, a work-support, mechanism for moving the support and abutment relatively to apply pressure to the work, mechanism for operating upon the work, an operator-controlled member movable from an inactive to an active position, connections to the member acting upon the initial movement thereof to start the pressure-applying mechanism, and connections to the member for starting the operating mechanism, the last-mentioned connections being effective only upon a second movement of the member after return to its inactive position.

60. In a machine for operating upon the heel-portions of shoes, an abutment, a work-support, mechanism for moving the support and abutment relatively to apply pressure to the work, pricking and nailing mechanism, an operator-controlled member, connections to the member for releasing the pressure-applying mechanism, and connections to the member for starting the pricking and nailing mechanism.

61. In a machine for operating upon the heel-portions of shoes, an abutment, a work-support, a spring arranged to be tensioned to move the support toward the abutment, pricking and nailing mechanism, a treadle, connections to the treadle for releasing the tensioned spring, and connections to the treadle for starting the pricking and nailing mechanism.

62. In a machine for operating upon the heel-portions of shoes, mechanism for applying pressure to the work, mechanism for operating upon said work, a member movable to govern the pressure-applying mechanism, a member movable while the just-mentioned member remains at rest to govern the operating mechanism, means for successively moving said members, and means for temporarily retaining one of the members in the governing position.

63. In a machine for operating upon the heel-portions of shoes, mechanism for applying pressure to the work, mechanism for operating upon said work, a member movable to govern the pressure-applying mechanism, a member movable to govern the operating mechanism, means for successively moving said members, means for temporarily retaining one of the members in the governing position, and means for releasing the retaining means upon the action of the mechanism last governed.

64. In a machine for operating upon the heel-portions of shoes, mechanism for applying pressure to the work, mechanism for operating upon said work, a member movable to govern the pressure-applying mechanism, a member movable to govern the operating mechanism, an operator-controlled member acting to first move the member governing the application of pressure, and means for retaining said governing member in the position to which it is moved, the operator-controlled member thereafter acting to move the member governing the operating mechanism.

65. In a machine for operating upon the heel portions of shoes, mechanism for applying pressure to the work, mechanism for operating upon said work, a member movable to govern the pressure-applying mechanism, a member movable to govern the operating mechanism, an operator-controlled member acting to first move the member governing the application of pressure, means for retaining said governing member in the position to which it is moved, the operator-controlled member thereafter acting to move the member governing the operating mechanism, and means movable by the operating mechanism to release the retaining means.

66. In a machine for operating upon the heel-portions of shoes, mechanism for applying pressure to the work, mechanism for operating upon said work, a lever for governing the pressure-applying mechanism, a latch for said lever, a lever for governing the operating mechanism, and an operator-controlled member arranged to successively move the levers.

67. In a machine for operating upon the heel-portions of shoes, mechanism for applying pressure to the work, mechanism for operating upon said work, a lever for governing the pressure-applying mechanism, a latch for said lever, a lever for governing the operating mechanism, an operator-controlled member arranged to move one of the governing levers, and connections between the thus-moved lever and the other governing lever to cause movement of the latter.

68. In a nailing machine, a spring arranged to be tensioned to apply pressure to the work, a pawl for holding the spring under tension, nailing mechanism, a clutch governing the application of power to the nailing mechanism, a release-lever co-operating with the pawl, a controlling lever connected to the clutch, a retaining detent for the release-lever, and a treadle arranged to act successively upon the release-lever and controlling lever.

69. In a nailing machine, a spring arranged to be tensioned to apply pressure to the work, a pawl for holding the spring under tension, nailing mechanism, a clutch governing the application of power to the nailing mechanism, a release-lever co-operating with the pawl, a controlling lever connected to the clutch, a retaining detent for the release-lever, a treadle arranged to act successively upon the release-lever and controlling lever, and means movable with the nailing mechanism to release the detent.

70. In a nailing machine, a spring arranged to be tensioned to apply pressure to the work, a pawl for holding the spring under tension, nailing mechanism, a clutch governing the application of power to the nailing mechanism, a release-lever co-operating with the pawl, a controlling lever connected to the clutch, a retaining detent for the release-lever, a treadle, and an actuating lever connected to the treadle and carrying a pawl arranged to co-operate successively with the release-lever and with the controlling lever.

71. In a nailing machine, a spring arranged to be tensioned to apply pressure to the work, a pawl for holding the spring under tension, nailing mechanism, a clutch governing the application of power to the nailing mechanism, a release-lever co-operating with the pawl, a controlling lever connected to the clutch, a retaining detent for the release-lever, a treadle, an actuating lever connected to the treadle and carrying a pawl arranged to co-operate successively with the release-lever and with the controlling lever, and means movable by the nailing mechanism for releasing the detent, said detent being arranged to move the pawl and free the release-lever therefrom.

72. In a machine for operating upon the heel-portions of shoes, a plurality of movable tools, driving mechanism, connections from the driving mechanism to one of the tools, connections between said tool and an associated tool, and means arranged to stop the movement of the tool directly connected to the driving mechanism between the extremes of its travel.

73. In a machine for operating upon the heel-portions of shoes, a plurality of reciprocatory tools, driving mechanism, connections from the driving mechanism to one of the tools, connections between said tool and an associated tool, and means arranged to stop the movement of the tool directly connected to the driving mechanism during its retreat from the work and before it reaches the outward extreme of its travel.

74. In a nailing machine, a reciprocatory nail-inserting member, a reciprocatory awl, driving mechanism for the inserting member, actuating connections between the inserting member and the awl, and brake mechanism arranged to stop the inserting member at a predetermined point in its travel.

75. In a nailing machine, a reciprocatory nail-inserting member, a reciprocatory awl, driving mechanism for the inserting member including a clutch, actuating connections between the inserting member and the awl, brake mechanism associated with the driving mechanism, and means arranged to release the clutch and apply the brake mechanism.

76. In a machine for operating upon the heel-portions of shoes, an abutment, a work-support, mechanism for moving the support and abutment relatively to apply pressure to the work, pricking and nailing mechanism, brake mechanism therefor, an operator-controlled member, connections to the member for releasing the pressure-applying mechanism, and connections to the member for releasing the brake mechanism and starting the pricking and nailing mechanism.

77. In a machine for operating upon the heel-portions of shoes, an abutment, a work-support, a spring arranged to be tensioned to move the support toward the abutment, pricking and nailing mechanism, brake mechanism, a treadle, connections to the treadle for releasing the tensioned spring, and connections to the treadle for releasing the brake mechanism and starting the pricking and nailing mechanism.

78. In a nailing machine, a spring arranged to be tensioned to apply pressure to the work, a pawl for holding the spring under tension, nailing mechanism, a clutch governing the application of power to the nailing mechanism, brake mechanism for the nailing mechanism, a release-lever co-operating with the pawl, a controlling lever connected to the clutch and brake mechanism, a retaining detent for the release-lever, and a treadle arranged to act successively upon the release-lever and controlling lever.

79. In a nailing machine, nailing mechanism, driving mechanism therfor including a wheel, a distrbutor for supplyng nails to the nailing mechanism, a friction-roll movable into and out of engagement with the wheel, and driving connections between the friction-roll and distributor.

80. In a nailing machine, nailing mechanism, driving mechanism therefor including a wheel, a distributor for supplying nails to the nailing mechanism, a friction-roll, a spring arranged to hold the roll both in and out of engagement with the wheel, and driving connections between the friction-roll and distributor.

81. In a nailing machine, nailing mechanism, driving mechanism therefor including a wheel, a distributor for supplying nails to the nailing mechanism, a bracket pivoted adjacent to the wheel, a roll movable upon the bracket, driving connections between the roll and distributor, a double treadle, and a spring connecting the treadle and bracket.

82. In a nailing machine, nailing mechanism, driving mechanism therefor including a wheel, a distributor for supplying nails to the nailing mechanism, a bracket pivoted adjacent to the wheel, a roll movable upon the bracket, driving connections between the roll and distributor, a double treadle, and a spring connecting the treadle and bracket and movable by said treadle to opposite sides of the bracket-pivot.

83. In a nailing machine, nailing mechanism, a movable actuating member therefor, a distributor for supplying nails to the nailing mechanism and including a movable nail-controlling member, and connections to the actuating member for moving the controlling member.

84. In a nailing machine, nailing mechanism, actuating means for the nailing mechanism including a reciprocatory side rod, a distributor for supplying nails to the nailing mechanism and including a movable nail-separator, and connections to the side rod for moving the separator.

85. In a nailing machine, nailing mechanism, a distributor for supplying nails to the nailing mechanism and including a movable nail-controlling member, and operating connections for the controlling member, said connections including a member movable into and out of position for contact with the controlling member.

86. In a nailing machine, nailing mechanism, a distributor for supplying nails to the nailing mechanism and including a movable nail-controlling member, and operating connections for the controlling member, said connections including a lever movable upon its fulcrum into and out of alinement with the controlling member.

87. In a nailing machine, nailing mechanism, actuating means for the nailing mechanism including a reciprocatory side rod, a distributor for supplying nails to the nailing mechanism and including a movable nail-separator, and connections to the side rod for moving the separator, said connections including a lever in constant connection with the side rod but movable upon its fulcrum into and out of alinement with the separator.

In testimony whereof I have signed my name to this specification.

GEORGE GODDU.